United States Patent
Baptist et al.

(10) Patent No.: US 9,354,980 B2
(45) Date of Patent: *May 31, 2016

(54) DISPERSED STORAGE HAVING SNAPSHOT CLONES AND METHODS FOR USE THEREWITH

(71) Applicant: CLEVERSAFE, INC., Chicago, IL (US)

(72) Inventors: Andrew Baptist, Mt. Pleasant, WI (US); Ilya Volvovski, Chicago, IL (US); Wesley Leggette, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/444,134

(22) Filed: Jul. 28, 2014

(65) Prior Publication Data

US 2014/0337686 A1    Nov. 13, 2014

Related U.S. Application Data

(63) Continuation of application No. 12/942,992, filed on Nov. 9, 2010, now Pat. No. 8,918,674.

(60) Provisional application No. 61/299,197, filed on Jan. 28, 2010.

(51) Int. Cl.
| | | |
|---|---|---|
| *G06F 11/08* | (2006.01) | |
| *G06F 11/14* | (2006.01) | |
| *G06F 17/30* | (2006.01) | |
| *H04L 29/08* | (2006.01) | |
| *G06F 11/10* | (2006.01) | |

(52) U.S. Cl.
CPC ........ *G06F 11/1448* (2013.01); *G06F 11/1076* (2013.01); *G06F 17/30194* (2013.01); *G06F 17/30215* (2013.01); *H04L 67/1097* (2013.01); *G06F 11/1008* (2013.01); *G06F 2201/805* (2013.01); *G06F 2201/84* (2013.01); *G06F 2211/1028* (2013.01)

(58) Field of Classification Search
CPC ................... G06F 17/30088; G06F 17/30212; G06F 17/30215; G06F 2201/84; G06F 11/1435; Y10S 707/99953; Y10S 707/99954; Y10S 707/99955

See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |

(Continued)

OTHER PUBLICATIONS

Creating Database Clones with ZFS really FAST by Ronny Egner Feb. 17, 2010 http://blog.ronnyegner-consulting.de/2010/02/17/creating-database-clones-with-zfs-really-fast/.*

(Continued)

*Primary Examiner* — Joseph Schell
(74) *Attorney, Agent, or Firm* — Garlick & Markison; Timothy W. Markison

(57) ABSTRACT

A directory file includes a plurality of entries, wherein an entry of the plurality of entries includes a file or directory name field, and a snapshot list field that includes a snapshot list. A clone snapshot identifier (ID) is determined for a data file. The directory file is updated to produce an updated directory file, wherein the updating includes updating the snapshot list field associated with the data file to include the clone snapshot ID in the snapshot list.

20 Claims, 10 Drawing Sheets

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 6,959,310 B2 * | 10/2005 | Eshel | G06F 17/30067 |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,409,511 B2 * | 8/2008 | Edwards | G06F 17/30067 |
| | | | 707/E17.01 |
| 7,636,724 B2 | 12/2009 | de la Torre et al. | |
| 7,882,071 B2 * | 2/2011 | Fachan | G06F 17/30088 |
| | | | 707/639 |
| 7,917,551 B2 * | 3/2011 | Chikusa | G06F 3/0605 |
| | | | 707/821 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2003/0158834 A1 * | 8/2003 | Sawdon | G06F 17/30067 |
| 2003/0158862 A1 * | 8/2003 | Eshel | G06F 17/30067 |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2013/0204893 A1 * | 8/2013 | Nicklin | G06F 17/30233 |
| | | | 707/769 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Appears in Proceedings of the Ninth International Conference on Architectural Support for Programming Languages and Operating Systems (ASPLOS 2000); Nov. 2000; pp. 1-12.

* cited by examiner computing system 10

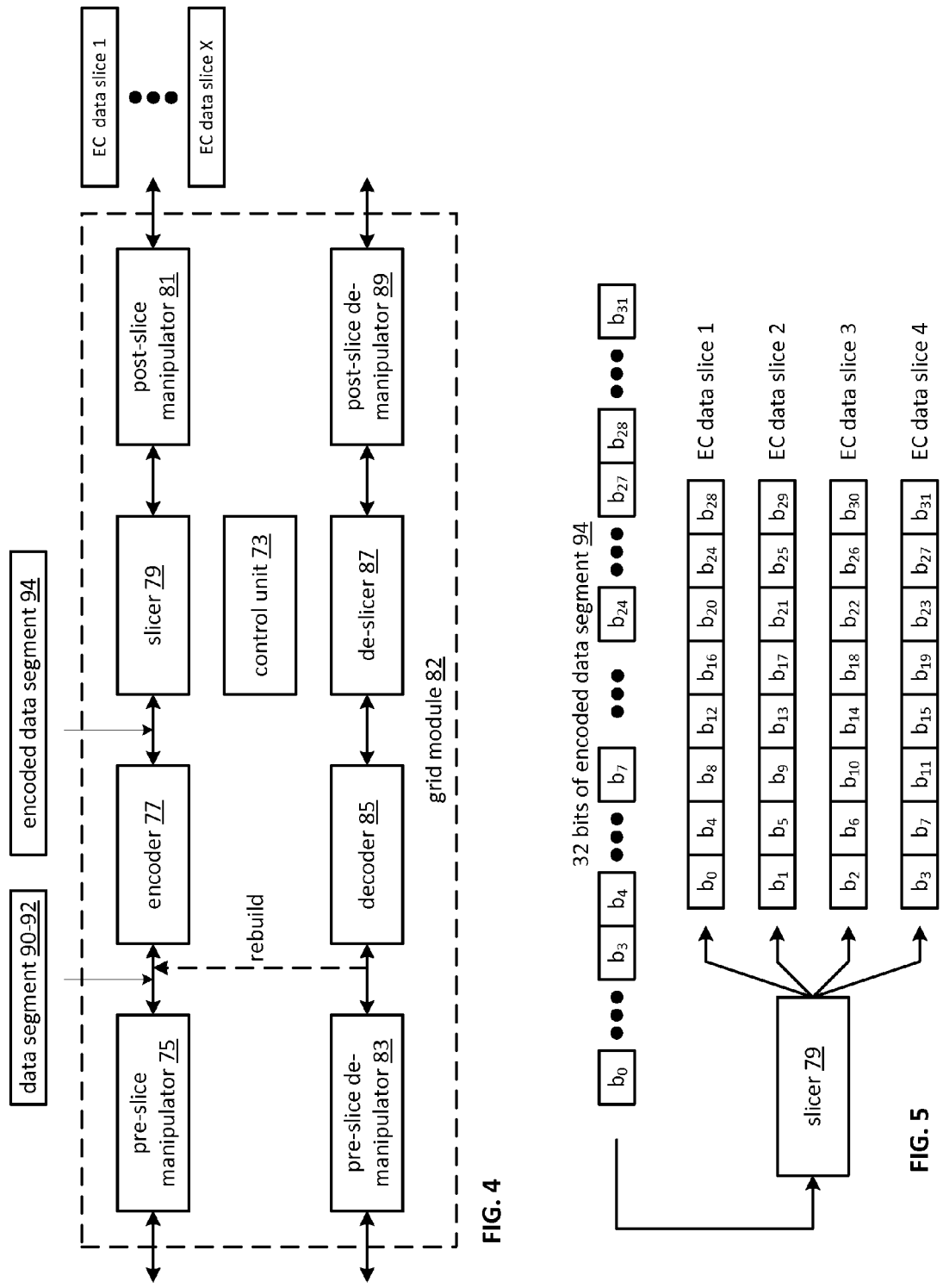

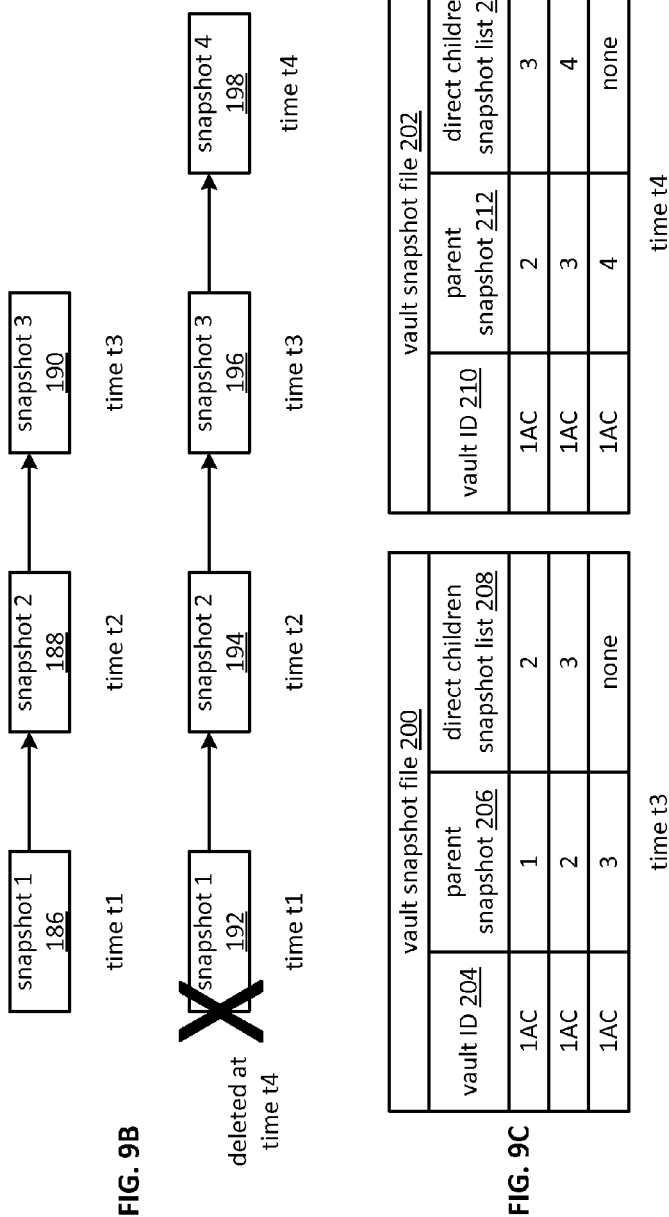

DISPERSED STORAGE HAVING SNAPSHOT CLONES AND METHODS FOR USE THEREWITH

CROSS REFERENCE TO RELATED PATENTS

The present U.S. Utility patent application claims priority pursuant to 35 U.S.C. §120 as a continuation of U.S. Utility application Ser. No. 12/942,992, entitled "DIRECTORY FILE SYSTEM IN A DISPERSED STORAGE NETWORK", filed Nov. 9, 2010, which claims priority pursuant to 35 U.S.C. §119(e) to U.S. Provisional Application No. 61/299,197, entitled "DIRECTORY FILE SYSTEM IN A DISPERSED STORAGE NETWORK", filed Jan. 28, 2010, both of which are hereby incorporated herein by reference in their entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

FIG. 9A is a table illustrating an example of a directory file in accordance with the invention;

FIG. 9B is a structure diagram illustrating an example of a directory snapshot structure in accordance with the invention;

FIG. 9C is a table set illustrating an example of a vault snapshot file in accordance with the invention;

DETAILED DESCRIPTION OF THE INVENTION

Figure 1:
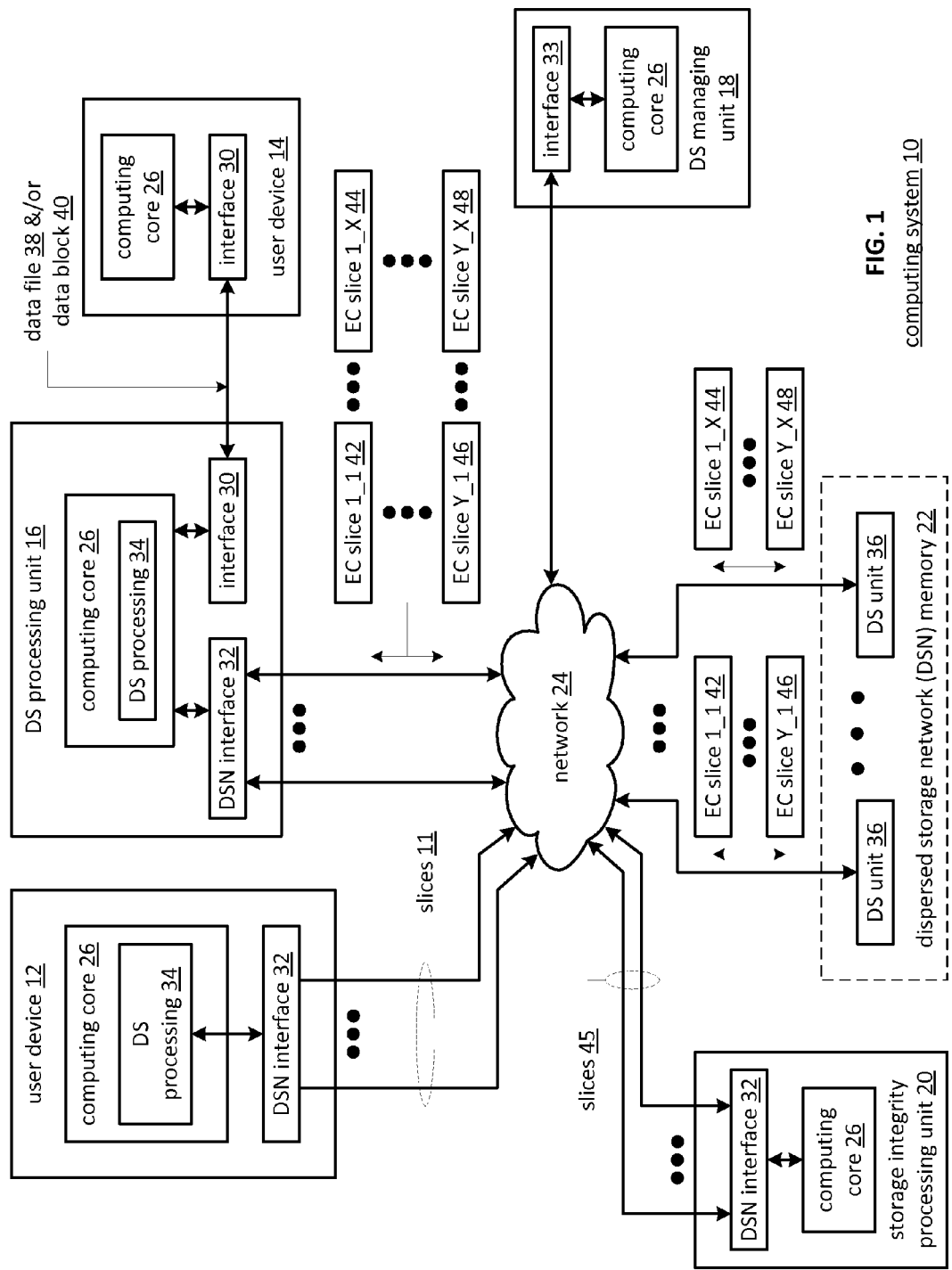
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-11B.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices, memory and/or units 12, 14, 16, 20, and/or 22 via the network 24.

In general and with respect to data storage, the computing system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the computing system 10 for potential failures, determines the devices' and/or units' activation status, determines the devices' and/or units' loading, and any other system level operation that affects the performance level of the computing system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the computing system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-11B.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the user device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
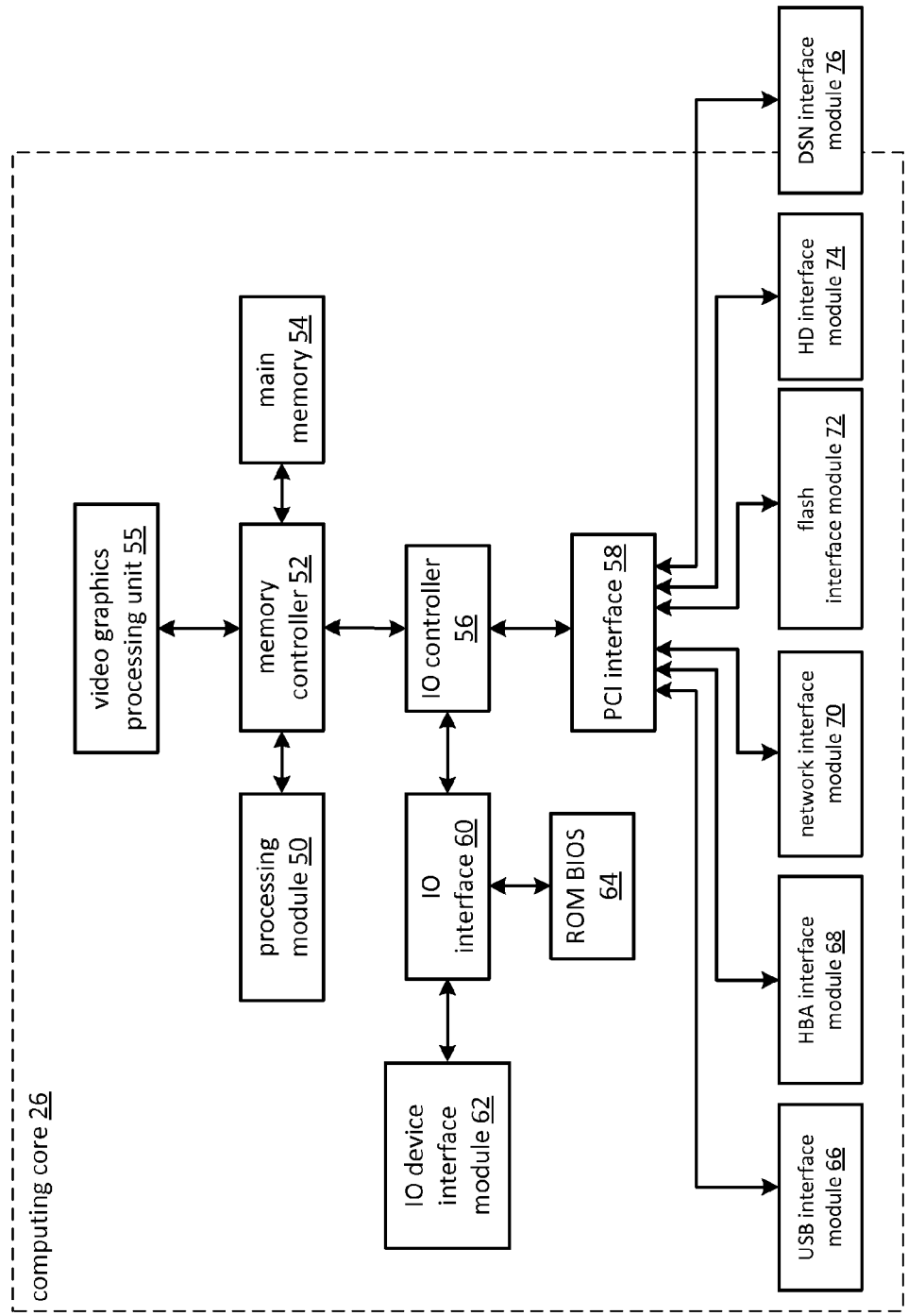
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-11B.

Figure 3:
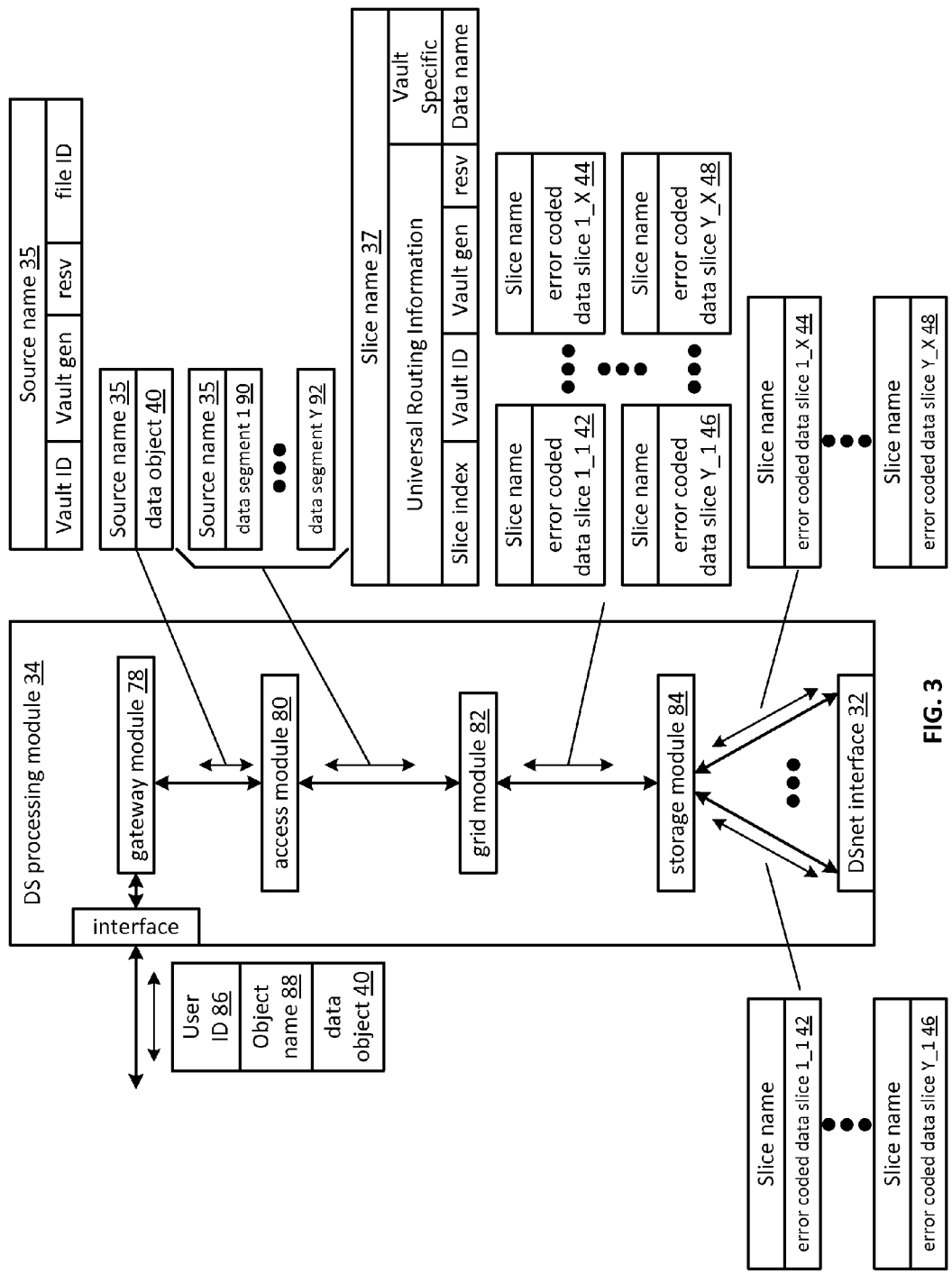
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the DS management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-48.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 90-92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 90-92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 90-92, the same encoding algorithm for the data segments 90-92 of a data object, or a combination thereof.

The encoded data segment 94 is of greater size than the data segment 90-92 by the overhead rate of the encoding algorithm by a factor of X/T, where X is the width or number of slices, and T is the read threshold. In this regard, the corresponding decoding process can accommodate at most X-T missing EC data slices and still recreate the data segment 90-92. For example, if X=16 and T=10, then the data segment 90-92 will be recoverable as long as 10 or more EC data slices per segment are not corrupted.

The slicer 79 transforms the encoded data segment 94 into EC data slices in accordance with the slicing parameter from the vault for this user and/or data segment 90-92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
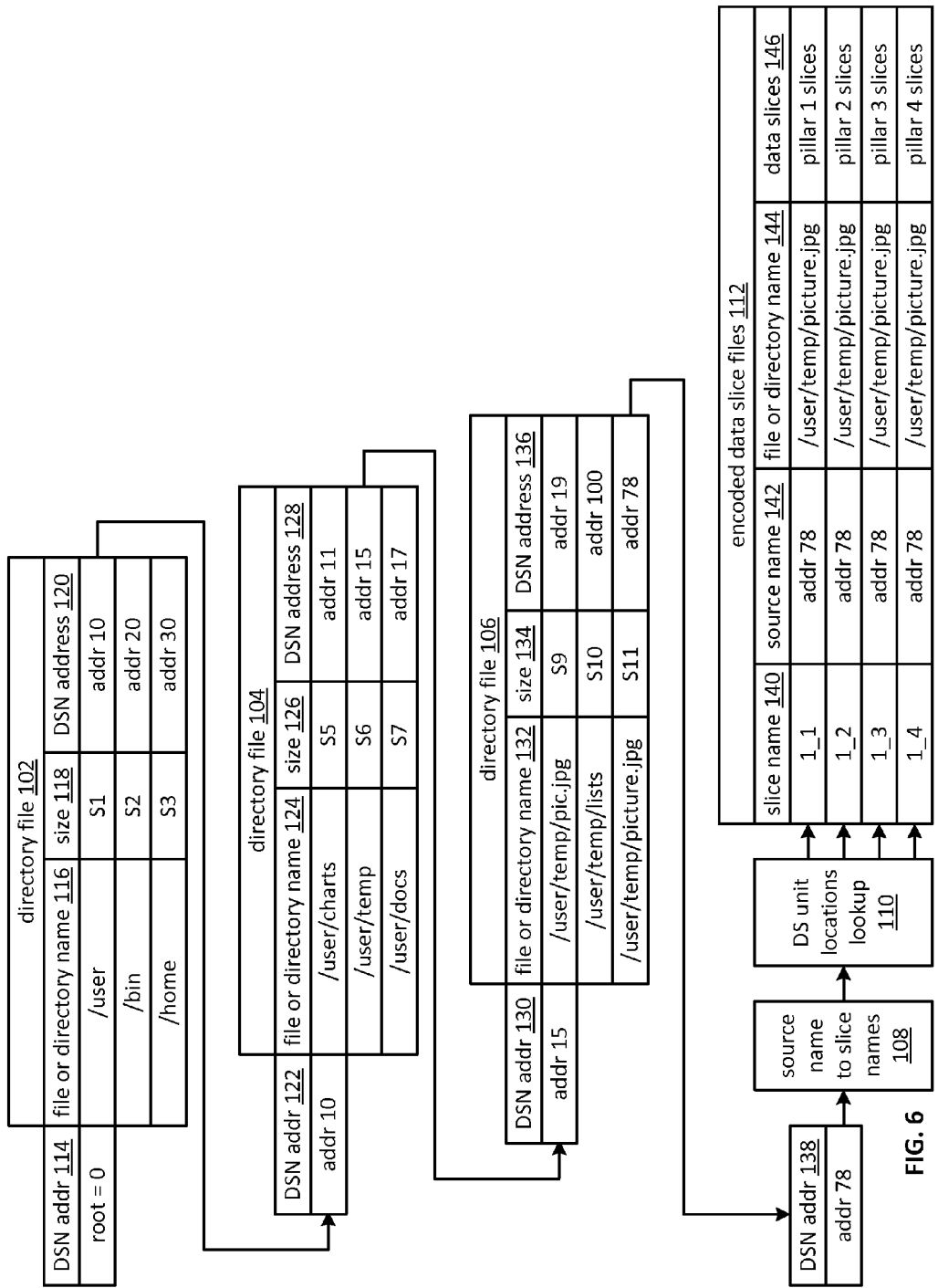
FIG. 6 is a structure diagram illustrating an example of a dispersed storage network (DSN) directory structure in accordance with the invention.

FIG. 6 is a structure diagram illustrating an example of a dispersed storage network (DSN) directory structure. As illustrated, the directory snapshot structure includes a plurality of directory files 102-106 linking to encoded data slices files 112. Such a directory structure may be utilized to determine a DSN address where encoded data slices are stored that correspond to a particular data object name. Note that the plurality of directory files 102-106 may be organized in chained layers such that a parent layer may point to a plurality of children layers and so on through any number of layers such that a DSN address (e.g., source name) in the last layer may be utilized to access the corresponding encoded data slices for a desired object name. In an example, a set of chained directory files may represent a directory structure for one user vault. In another example, a set of chained directory files may represent a directory structure for more than one user vault. In another example, a first directory file may be addressed at a predetermined DSN address (e.g., the root address such as address 0) and subsequent directory files are all linked back to the first directory file.

Note that the plurality of directory files 102-106 are stored as encoded directory slices in a DSN memory. As illustrated, the plurality of directory files 102-106 include a file or directory field 116, 124, 132, a size field 118, 126, 134, and a DSN address field 120, 128, 136. The file or directory field 116, 124, 132, may be utilized to depict a directory path to that layer of the directory structure or the file name that is stored at a DSN address of the DSN address field 120, 128, 136. In an example, the directory file may also include a flag to signify that the file or directory name field contains a filename or a directory name. The size field 118, 126, 134 may represent the number of bytes contained in all of the subsequent directory files and encoded directory slice files at layers below the current layer. The DSN address field 120, 128, 136 may be utilized to depict a source name of a child layer that is at the next layer down in the directory structure.

As illustrated, the directory file 104 is stored at DSN address 10 and contains three entries. The first entry has a file or directory name field 124 value of /user/charts to signify that the pathname at this layer is /user/charts, a size field value of S5 (e.g., 4 gigabytes), and a DSN address of address 11 (e.g., the source of the next layer along that pathname. The second entry has a file or directory name field value of /user/temp to signify that the pathname at this layer is /user/temp, a size field value of S6, and a DSN address of address 15. The third entry has a file or directory name field value of /user/docs to signify that the pathname at this layer is /user/docs, a size field value of S7, and a DSN address of address 17.

As illustrated, the /user pathname of the first directory file (e.g., root directory file 102) points to a second directory file (e.g., directory file 104 at DSN address 10). The/user/temp pathname of the second directory file points to a third directory file 106 at DSN address 15. The /user/temp/picture.jpg file name of the third directory file points to DSN address 78 where encoded data slices are stored for this data object name. The DSN address 78 (e.g., the source name) is utilized to determine slice names where the encoded data slices are stored utilizing the source name to slice names 108 process previously described. The slice names are utilized to look up dispersed storage (DS) unit locations (e.g., in the virtual DSN address to physical location table) in a DS unit locations look up process 110 as previously discussed to determine where the encoded data slices are stored in the DSN memory.

As illustrated, encoded data slice files 112 may include a slice name field 140, a source name field 142, a file or directory name field 144, and encoded data slices 146. In an example, the encoded data slice files may also include one or more of a checksum field, a metadata field, a data size field, the user identifier (ID) field, and a vault ID. As illustrated, the encoded data slice files 112 are organized in a four pillar wide system. The slice name field 140 includes slice names 1_1, 1_2, 1_3, and 1_4. The source name field 142 includes DSN address 78. The file or directory name field 144 includes the filename /user/temp/picture.jpg. The encoded data slices pillars includes the slices for each of the four pillars. Note that the example illustrates one of Y data segments. The encoded data slice files are stored in the memory of the DS unit as previously discussed. Note that the example illustrates the encoded data slices of the filename picture.jpg.

Note that the directory file structure may be created and stored in the DSN memory by a processing module of one or more of a user device, a DS processing unit, a DS managing unit, a storage integrity processing unit, and a DS unit. The processing module may receive a file structure pathname from a user device, assign a DSN addresses, create and/or modify chained directory files, and send the directory files to the DSN memory for storage as encoded directory slices.

In a data retrieval example of operation, a processing module determines a root directory dispersed storage network (DSN) address based on at least one of a predetermination, a user identifier (ID), a user vault lookup based on the user ID, and a data ID. Note that the data ID may include at least one of a filename, a directory name, a path, and a block number. Next, processing module retrieves a set of encoded root directory slices from a DSN memory based on the root directory DSN address. The processing module dispersed storage error encodes the set of encoded root directory slices to reproduce a root directory. Note that the root directory includes at least one of a filename, a path, a size indicator, and a DSN address. The processing module utilizes the DSN address to link to either a file stored as slices in a DSN memory or to a directory file that is stored as slices in the DSN memory. Note that there may be any number of linked directory files between the root directory and a directory file containing the DSN address of a desired filename. The processing module determines if the root directory includes a DSN address that links to another record file or to a desired file based on whether any of the entries of the directory include a desired filename of the desired file. The processing module extracts a data DSN address from the root directory when the filename is stored in the root directory.

The processing module enters into a processing sequence when the filename corresponding to a desired data ID is not stored in the root directory. In such a processing sequence, the processing module begins the sequence by extracting a current intermediate directory DSN address from a preceding directory (e.g., the root directory during a first portion of the sequence). Note that the current intermediate directory DSN address includes at least one source name and at least one slice name. Next, the processing module retrieves a set of encoded current intermediate directory slices from the DSN memory based on the current intermediate directory DSN address. The method of the sequence continues where the processing module dispersed storage error encodes the set of encoded current intermediate directory slices to reproduce a current intermediate directory. Next, the processing module determines whether the filename is stored in the current intermediate directory. The processing module repeats the processing sequence for a next current intermediate directory DSN address when the filename is not stored in the current intermediate directory. The processing module extracts a data DSN address and exits the processing sequence when the filename is stored in the current intermediate directory. In the retrieval example of operation continued, the processing module retrieves a set of encoded data slices from the DSN memory based on a data DSN address subsequent to the processing sequence. Next, the processing module dispersed storage error encodes the set of encoded data slices to reproduce data.

In a data storage example of operation, a method begins where a processing module receives a data storage request. Note that the data storage request may include data and a data identifier (ID). Next, the processing module dispersed storage error encodes the data to produce a set of encoded data slices. The method continues with the step where the processing module determines a data dispersed storage network (DSN) address based on the data ID. Such a data DSN address may include at least one of a source name and at least one slice name. The method continues with the step where the processing module sends the set of encoded data slices to a DSN memory for storage at the data DSN address.

The method continues with the step where the processing module updates a directory file with path information corresponding to the data ID and the data DSN address to produce an updated directory file. Note that the directory file may include one or more directories, wherein a directory of the one or more directories includes at least one of a filename, a path, a size indicator, and a DSN address. When updating the directory file, the processing module determines whether the directory file is stored in the DSN memory, retrieves a set of encoded directory slices from the DSN memory based on the directory DSN address, and dispersed storage error decodes the set of encoded directory slices to reproduce the directory file when the processing module determines that the directory file is stored in the DSN memory. The processing module creates the directory file to include at least one of a filename field, a path field, a size indicator field, and a DSN address field when the directory file is not stored in the DSN memory. Alternatively, or in addition to, the processing module may update the directory file by obtaining a parent directory (e.g., another higher level intermediate directory or the root directory), updating the parent directory with the directory DSN address and at least a portion of the data ID (e.g., a path) to produce an updated parent directory, dispersed storage error encoding the updated parent directory to produce a set of encoded updated parent directory slices, and sending the set of encoded updated parent directory slices to the DSN memory for storage at a parent directory DSN address. The storage example of operation continues with the step where the processing module dispersed storage error encodes the updated directory file to produce a set of encoded updated directory slices. Next, the processing module sends the set of encoded updated directory slices to the DSN memory for storage at a directory DSN address.

Figure 7:
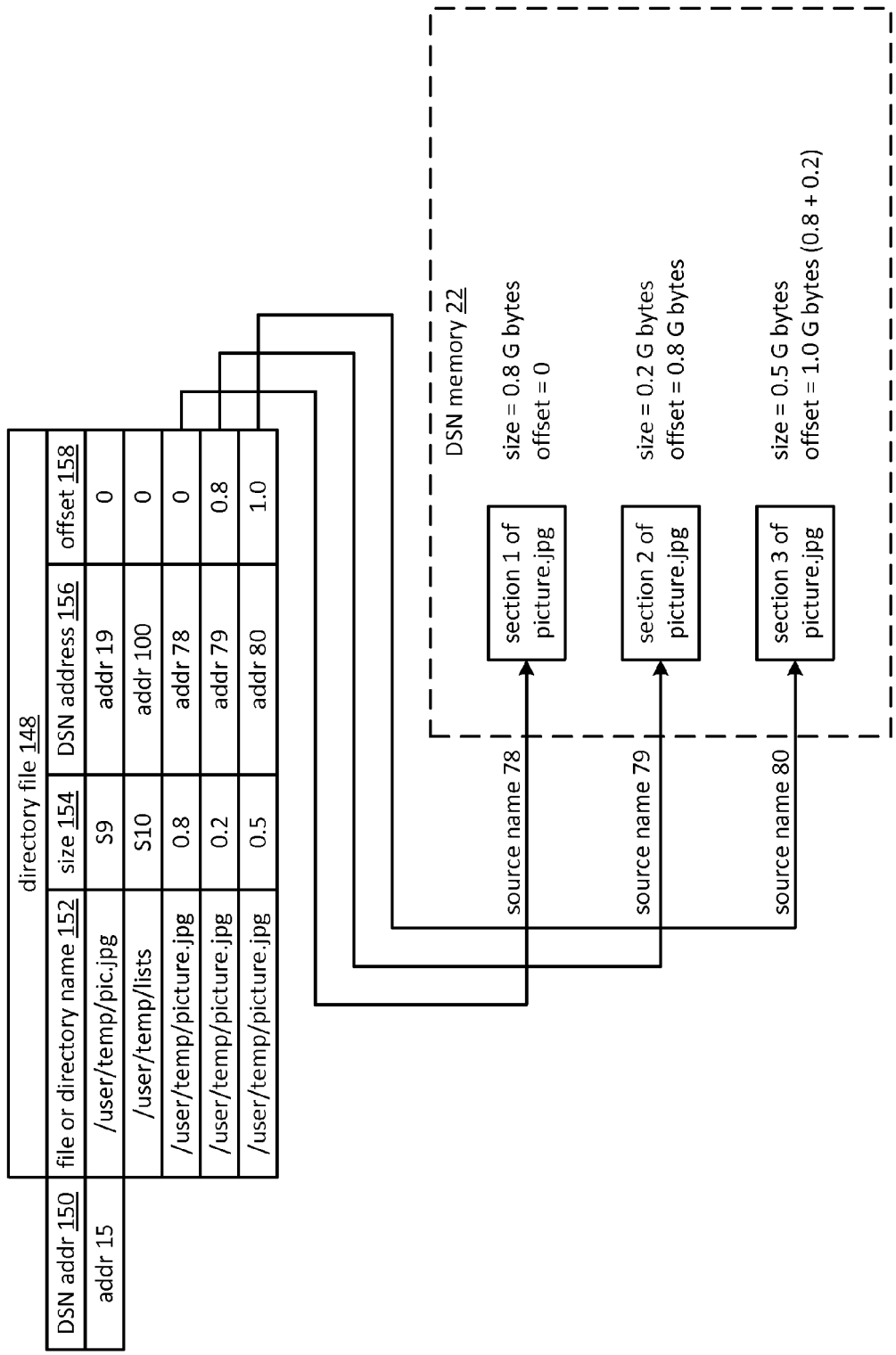
FIG. 7 is another structure diagram illustrating another example of a dispersed storage network (DSN) directory structure in accordance with the invention.

FIG. 7 is another structure diagram illustrating another example of a dispersed storage network (DSN) directory structure where a data object may be stored in a DSN memory at two or more DSN addresses. Note that this arrangement may provide an improvement where a data object is received by the DSN system in two or more sections (e.g., reception was interrupted) such that each section may be sequentially stored in the DSN memory upon reception.

As illustrated, a directory file 148 may include a file or directory name field 152, a size field 154, a DSN address field 156, and an offset field 158. The directory name field 152, the size field 154, and the DSN address field 156 are utilized as previously discussed linking and entry of the directory file 148 to encoded data slices stored in a DSN memory 22. The offset field 158 may indicate how far into the data object a section starts (e.g., with reference to the start). For example, a first section has an offset of zero, a second section has an offset identical in size to the size of the first section, a third section has an offset identical in size to the sum of the size of the first and second sections etc. As illustrated, a first section of the data object /user/temp/picture.jpg has an offset of zero, a size of 0.8 gigabytes and is stored at DSN address 78 of the DSN memory 22. A second section has an offset of 0.8 gigabytes, a size of 0.2 gigabytes, and is stored at DSN address 79 of the DSN memory 22. A third section has an offset of 1.0 gigabytes (e.g., 0.8+0.2), a size of 0.5 gigabytes, and is stored at DSN address 80 of the DSN memory 22. Note that the total size of the data object is the sum of the size of each of the sections (0.8+0.2+0.5=1.5 gigabytes).

In an example of operation, a processing module of a DS processing unit receives a store data object request from a user device. Such a request may include one or more of a user ID, a request, a data object name (e.g., /user/temp/picture.jpg), a data size (e.g., 1.5 gigabytes), a data object, and other metadata to facilitate storage and retrieval of the data object. The processing module receives the data object from the requester. Note that the reception of the data object may be interrupted. The processing module determines whether to create and store a first section based on one or more of the amount of data received so far (e.g., for the current section), the data size, a time indicator, a reception activity indicator, a user vault lookup, a maximum size per section indicator, a command, a predetermination, and a lookup. For example, the processing module determines to create and store the first section when the reception activity indicator indicates that the transmission has been interrupted. Next, the processing module determines the next available DSN address (e.g., 78) to store at least a first section of the data object when the processing module determines to create and store a section. The method continues with the step where the processing module determines an offset to be how much of the data object has been previously received (e.g., previous to the present section). Next, the processing module retrieves the directory file and adds an entry for the at least a first section of the data object where the entry includes the pathname, the size of the present section, DSN address of the present section, and the offset. The processing module continues the method until the entire data object (e.g., total received the same as the data size) has been received and stored.

In another example of operation, a processing module of a DS processing unit receives a retrieve data object message from a user device. Such a request may include one or more of a user ID, a request, a data object name (e.g., /user/temp/picture.jpg), a data size, and/or other metadata to facilitate retrieval of the data object. Next, the processing module retrieves the directory file containing the data object name from a DSN memory. The method continues with the step where the processing module identifies entries for the same data object name within the directory file. Next, the processing module retrieves encoded data slice sets at each DSN address corresponding to the data object name. The processing module dispersed storage error decodes the encoded data slice sets to reproduce one or more sections of the data object. Next, the processing module reproduces the data object based on the sections and in accordance with offset field information from the directory file. For example, processing module utilizes the offset field information to aggregate the sections in order. The processing module sends the data object to the requester.

Figure 8:
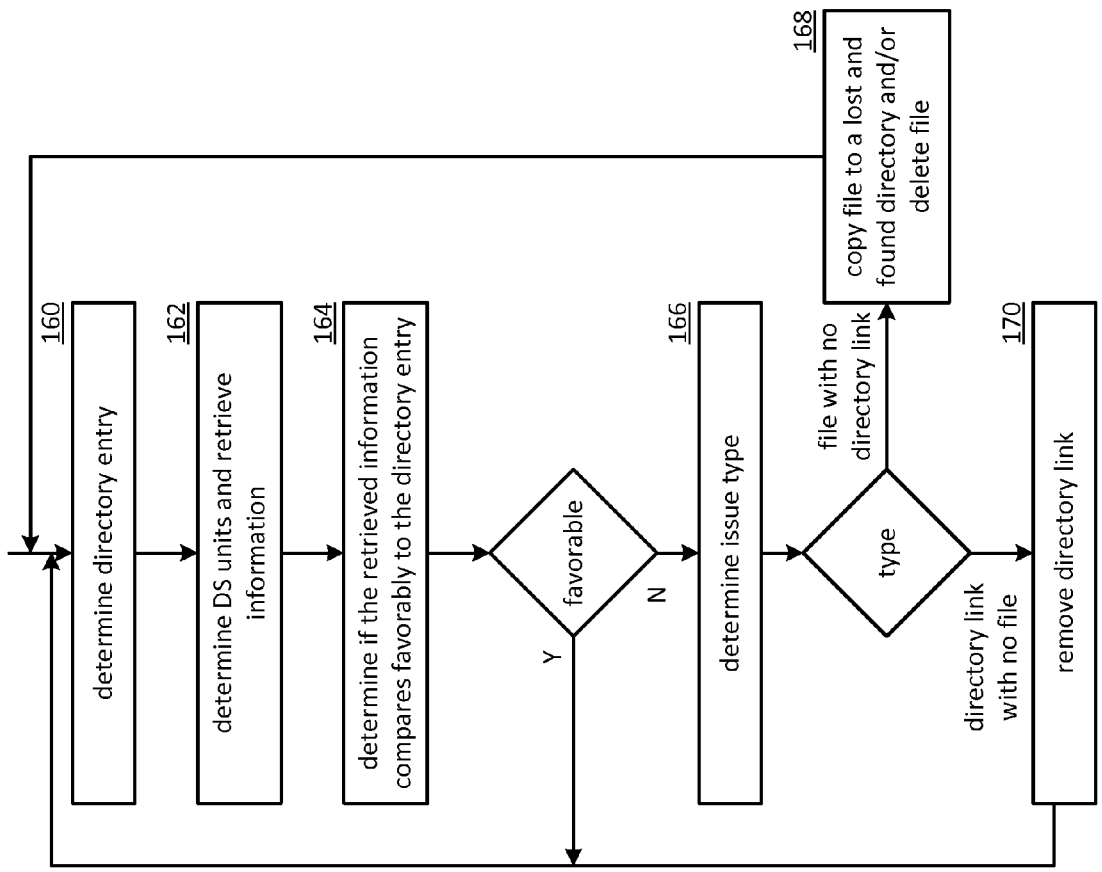
FIG. 8 is a flowchart illustrating an example of repairing a dispersed storage network (DSN) directory structure in accordance with the invention.

FIG. 8 is a flowchart illustrating an example of repairing a dispersed storage network (DSN) directory structure when a mismatch between a directory and stored files is detected. Such a mismatch may include when a directory link points to a file location in a DSN memory but the file is not there or when a file is stored in the DSN memory but there is no directory link that points to the file. Note that the method may provide a memory utilization efficiency improvement by resolving the mismatch.

The method begins with step 160 where a processing module determines a directory entry where the mismatch detection process will be executed. Such a determination may be based on one or more of the root directory file (e.g., address zero for the system or for a user vault), the next entry down in a directory where a previous verification left off, a command, a predetermination, a user vault lookup, a testing algorithm, a list, a sequence, and the next entry if all of the verification is done down a particular path. Note that the method may attempt to detect mismatches of none, one, two or more, or all possible branches of a directory structure.

The method continues at step 162 where the processing module determines a source name of the directory path based on retrieving the directory entry. At step 162, the processing module determines DS units and slice names of the next directory layer or file in accordance with operational parameters based on the source name. In an example, the processing module retrieves a slice name list from each DS unit to verify that the slices of the data object are stored where they should be on the DS units. In another example, the processing module retrieves slices from each DS unit to verify that the slices of the data object are stored where they should be on the DS units.

The method continues with step 164 where the processing module determines if the retrieved information compares favorably to the directory entry. Note that a favorable comparison may be indicated when slices are found to be stored on the DS units that correspond to the data object from the directory. An unfavorable comparison may be indicated when slices are not found on the DS unit that correspond to the data object from the directory. In addition, an unfavorable comparison may be indicated when the slice name list from the DS unit indicates that a data object is stored on the DS unit that is not contained in a directory entry (e.g., the pathname from the slice name list of the DS unit is not present in the chain directory files). The method repeats back to step 160 when the processing module determines that the retrieved information compares favorably to the directory entry. The method continues to step 166 when the processing module determines that the retrieved information does not compare favorably to the directory entry.

The method continues at step 166 where the processing module determines an issue type based on a root cause of the unfavorable comparison. The method branches to the step 170 when the processing module determines that the issue type is a directory link with no file. The method continues to step 168 when the processing module determines that the issue type is a file with no directory link. At step 168, the processing module retrieves a data object file from the DSN memory and stores the data object in a lost and found directory. Alternatively, or in addition to, the processing module deletes the file from the DSN memory by sending a delete file command to the DS units. Note that the file that is in the lost and found directory may be subsequently processed. The method repeats back to step 160.

The method continues with step 170 where the processing module removes the directory link by retrieving the directory file from the DSN memory, deleting the entry for the missing file, and sending the directory file to the DSN memory for storage when the processing module determines that the issue type is a directory link with no file. The method repeats back to step 160.

FIG. 9A is a table illustrating an example of a directory file 172 that may be utilized to track snapshots of storage locations of multiple revisions of a file or to link multiple directories. In an example, a snapshot may be associated with a configuration of a plurality of chained directory files and data object files in a dispersed storage network (DSN) memory. For instance, a first snapshot is associated with a configuration of a directory file system at a first point in time. In another instance, a second snapshot is associated with the configuration of the directory file system at a second point in time. A snapshot identifier (ID) provides a reference to distinguish one snapshot from another. Note that a later snapshot includes changes to the directory file system and file revision numbers since the last snapshot was created.

As illustrated, the directory file 172 includes a file or directory name field 176, a size field 178, a DSN address field 180, a revision field 182, and a snapshot list field 184. The revision field 182 may specify a unique version of an associated data object. For example, an initial version may be revision 1, followed by a revision 2, followed by a revision 3, etc. Note that the revision number may be included within the DSN address field 180 (e.g., a source name) and/or revision field 182. Note that each revision of a same data object is stored at different DSN addresses. In an example, the directory file 172 is a file that is stored as encoded directory slices at a DSN address of 15 as illustrated by a DSN address 174.

Note that the snapshot list field 184 may specify one or more snapshot IDs are associated with a directory file entry. For example, revision 1 of a data object /user/temp/pic.jpg is affiliated with snapshot IDs 1, 2, and 3. In this instance, data object pic.jpg has not changed since snapshots 1, 2, and 3 were determined. In another example, revision 1 of the data object /user/temp/stuff.txt is affiliated with snapshot ID 1, revision 2 of the data object /user/temp/stuff.txt is affiliated with snapshot ID 2, and revision 3 of the data object /user/temp/stuff.txt is affiliated with snapshot ID 3. Note that in such an example, a snapshot was taken subsequent to the addition of each revision of stuff.txt.

In an example of adding a snapshot, a processing module obtains a directory file 172. Such a directory file 172 includes at least one of a filename 176, a directory name 176, a path (e.g. a file system path), a block number, a size indicator 178, a dispersed storage network (DSN) address 180, a revision 182, and a snapshot identifier (ID) list 184. In an instance of obtaining the directory file 172, the processing module retrieves a set of encoded directory file slices from a DSN memory based on a directory file DSN address 174 and dispersed storage error decodes the set of encoded directory file slices to reproduce the directory file 172. In another instance, the processing module receives the directory file 172 as an output of another process. In another instance, the processing module retrieves the directory file 172 from a local memory associated with the processing module.

The processing module then determines a new snapshot identifier (ID) 184 for the directory file 172. Such a new snapshot ID 184 may include at least one of a predetermined value, a value based on a previous snapshot ID (e.g., a last assigned snapshot ID incremented by one), a value based on a user ID (e.g., a sequential number based on a lookup corresponding to a user ID associated with a snapshot operation), and a value based on a vault ID. Such a determination of the new snapshot ID may be based on at least one of receiving a command to produce the new snapshot ID, accessing a lookup table at a given time to produce the new snapshot ID, producing the new snapshot ID at an expiration of a period of time since producing a previous snapshot ID (e.g., create snapshots every 60 minutes), producing the new snapshot ID when a number of changes to the directory file compares favorably to a directory change threshold (e.g., achieving a maximum number of snapshots per revision), and producing the new snapshot ID when a number of changes to the filename compares favorably to a filename change threshold (e.g., achieving a maximum number of revisions per filename).

The processing module then identifies a version of a filename to associate with the new snapshot ID. For example, the processing module identifies the latest revision 182 of each filename. Note that the latest revision may have been the latest revision during one or more previous snapshot generations. In an instance, as illustrated, revision 1 of pic.jpg was already associated with snapshots 1 and 2 when snapshot 3 is generated. In another instance, revision 3 of stuff.txt was not associated with any snapshot when snapshot 3 is generated.

The processing module then updates the directory file 172 by associating the snapshot ID to the version (e.g., revision number) of the filename to produce an updated directory file. For example, the processing module adds the snapshot ID to the snapshot ID field 184 associated with the directory file entry of the corresponding revision and filename. The processing module then dispersed storage error encodes the updated directory file to produce a set of encoded updated directory file slices and sends the set of encoded updated directory file slices to a dispersed storage network (DSN) memory for storage.

In another example of operation, the processing module retrieves the directory file 172 based on a requested snapshot ID. For instance, the desired snapshot ID may be received from a user device. In such an instance, the processing module may retrieve stuff.txt from DSN address for 457 and pic.jpg from address 19 when a snapshot ID 2 is requested.

FIG. 9B is a structure diagram illustrating an example of a directory snapshot structure depicting linkage and timing history of snapshot creation. As illustrated, a processing module creates snapshot 1 186 at time t1, followed by the creation of snapshot 2 188 at time 2, followed by the creation of snapshot 3 190 at time t3.

In an example of deleting a snapshot, a processing module obtains a directory file as previously discussed. Next, the processing module identifies an old snapshot ID wherein the identifying the old snapshot ID includes at least one of receiving a command that includes the old snapshot ID, identifying the old snapshot ID based on a snapshot deletion policy, accessing a lookup table at a given time to identify the old snapshot ID, identifying the old snapshot ID when a snapshot size indicator is greater than a size threshold, identifying the old snapshot ID at an expiration of a period of time since identifying a previous old snapshot ID (e.g., to facilitate deletion of snapshots every 60 minutes), identifying the old snapshot ID when a number of changes to the directory file compares favorably to a directory change threshold, and identifying the old snapshot ID when a number of changes to the filename compares favorably to a filename change threshold.

In an example, the processing module utilizes the snapshot deletion policy to maintain a fixed number of snapshots (e.g., 3) by deleting the oldest snapshot when a new snapshot is created. As illustrated, the processing module creates snapshot 4 198 at time t4 and deletes snapshot 1 192 at time t4 when the snapshot deletion policy allows a maximum of three active snapshots. In another example, the processing module utilizes the snapshot deletion policy to maintain the number of snapshots per user vault to be within a range (e.g., maximum ranges) as a function of memory utilization. In another example, the processing module identifies the old snapshot ID when the snapshot size indicator is greater than the size threshold and the old snapshot ID is the oldest snapshot. Note that the size threshold may be utilized to set a maximum amount of storage utilized for one or more snapshots.

The snapshot deletion example continues with the processing module identifying a version (e.g., a revision) of a filename associated with the old snapshot ID. For example, the processing module identifies a directory file entry (e.g., a revision) associated with the old snapshot ID by identifying the old snapshot ID within the snapshot list field 184 of the directory file entry. The processing module then updates the directory file by deleting an entry of the version of the filename to produce an updated directory file. Next, the processing module dispersed storage error encodes the modified directory file to produce a set of encoded modified directory file slices and sends the set of encoded modified directory file slices to a dispersed storage network (DSN) memory for storage at a directory file DSN address.

The processing module then identifies a directory entry that is not associated with a snapshot ID (e.g., deleted) and updates the directory file by deleting the directory entry. Alternatively, or in addition to, the processing module may delete from the DSN memory, encoded data slices identified by a filename associated with the directory entry (e.g., delete all subsequent directory entries and data file slices for this old revision). For example, the processing module deletes pic.jpg, /user/temp/lists, and revision 1 of stuff.txt as they are all affiliated with snapshot ID 1. In another example, the processing module deletes data objects from the DSN memory that are affiliated with the snapshot ID unless the data object is affiliated with a snapshot that is still active. For instance, the processing module deletes revision 1 of stuff.txt as it is the only snapshot affiliated with snapshot ID 1 that isn't affiliated with any other active snapshots. In addition, the processing module does not delete pic.jpg when snapshot ID 1 is deleted since pic.jpg is affiliated with active snapshots 2 and 3.

FIG. 9C is a table set illustrating an example of a vault snapshot file 200-202 that may be utilized to maintain a record of snapshot relationships to each other. Note that the vault snapshot file 200-202 may be stored in a dispersed storage network (DSN) memory. As illustrated, the vault snapshot file 200-202 may include a vault identifier (ID) field 204, 210, a parent snapshot field 206, 212, and a direct children snapshot list field 208, 214. Note that vault snapshot file 200 represents a snapshot at time t3 and vault snapshot file 202 represent a snapshot at time t4.

The parent snapshot field 206, 212, may specify a snapshot ID of a parent snapshot that preceded a child snapshot specified in the direct children snapshot list field 208, 214. As illustrated, at time t3 snapshot 2 is a child of snapshot 1, snapshot 3 is a child of snapshot 2 and snapshot 3 has no child since it is the most recent snapshot subsequent to time t3 but the prior to time t4.

The vault snapshot file 200, 202 may be utilized to determine an oldest snapshot, a newest snapshot, and all snapshots in order in between the oldest and newest. For example, the processing module may utilize the vault snapshot file 200, 202, to determine the oldest snapshot ID to delete when the processing module determines that it is time to delete the oldest snapshot. In another example, the processing module may utilize the vault snapshot file 200, 202, to determine the newest (e.g., most recent) snapshot ID such that the processing module may determine the next snapshot ID to assign.

In an example of operation when a new snapshot ID is added, the processing module updates the vault snapshot file to associate the new snapshot ID with at least one previous snapshot ID to produce an updated vault snapshot file. For instance, the processing module updates the vault snapshot file to associate new snapshot ID 4 with previous snapshot ID 3. The processing module then dispersed storage error encodes the updated vault snapshot file to produce a set of encoded updated vault snapshot file slices and sends the set of encoded updated vault snapshot file slices to the DSN memory for storage.

In another example of operation, the processing module determines to delete the oldest snapshot and add a new snapshot at time t4. The processing module retrieves vault snapshot file 200 and determines that the oldest snapshot ID is snapshot ID 1 and the most recently assigned snapshot ID is snapshot ID 3. The processing module modifies the vault snapshot file 200 to produce a modified vault snapshot file 202. For instance, the processing module deletes snapshot ID 1, thus snapshot 2 is now the oldest snapshot ID, and the processing module establishes newly assigned snapshot 4 as a child to snapshot ID 3. Note that snapshot ID 4 has no child snapshot. In addition, the processing module may dispersed storage error encode the modified vault snapshot file 202 to create encoded vault slices and send the slices to the DSN memory for storage.

Figures 10A, 10B:
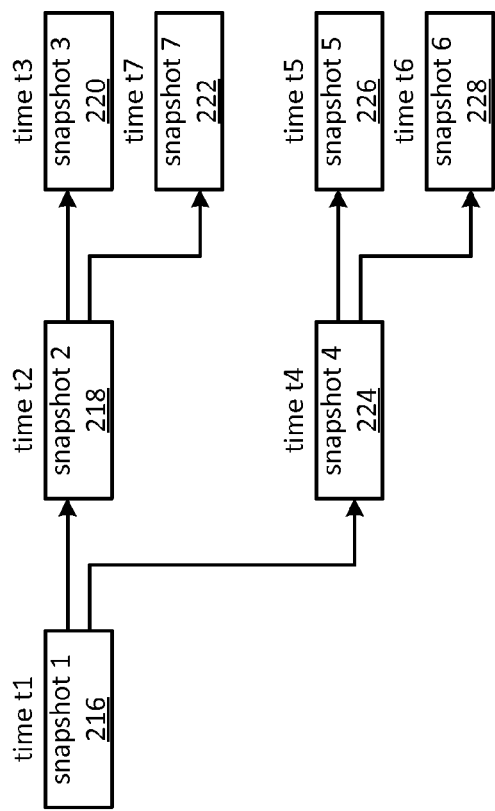
FIG. 10A is another structure diagram illustrating another example of a directory snapshot structure in accordance with the invention.
FIG. 10B is a table illustrating another example of a vault snapshot file in accordance with the invention.

FIG. 10A is another structure diagram illustrating another example of a directory snapshot structure depicting linkage and timing history of snapshot creation. In an example, a processing module created snapshot 1 216 at time t1, followed by snapshot 2 218 at time t2, followed by snapshot 3 220 at time t3, then snapshot 4 224 at t4, snapshot 5 226 at t5, snapshot 6 228 at t6, and snapshot 7 222 at t7. Note that snapshot 3 220 and snapshot 7 222 are both child snapshots of parent snapshot 2 218. In this example, snapshot 3 220 and snapshot 7 222 both branch from common snapshot 2 218. In an example, snapshot 2 218 and snapshot 4 224 both branch from a common snapshot 1 216. In another example, snapshot 5 226 and snapshot 6 228 both branch from a common snapshot 4 224.

Note that two or more child snapshots that share a common parent snapshot share common data object revisions of the common parent snapshot and may have unique revisions to the child snapshot for any one or more data objects. In such an instance, children snapshots of a common parent snapshot may not have the same data object revisions. Note that such a structure may provide an improvement where unique sets of the revisions can be organized by the different paths of the snapshot branches. As illustrated, snapshot 3 220 and snapshot 7 222 may share commonality of revisions specified by snapshot 2 218 unless newer revisions are specified by snapshot 3 220 and/or snapshot 7 222. Adding a new branch snapshot is discussed in greater detail with reference to FIG. 10B.

FIG. 10B is a table illustrating another example of a vault snapshot file 230 and may include a vault identifier (ID) field 232, a parent snapshot field 234, and a direct children snapshot list field 236. The vault identifier (ID) field 232, the parent snapshot field 234, and the direct children snapshot list field 236 are used to store information as previously discussed. As illustrated, the vault snapshot file 230 is populated with values that reflect a directory snapshot structure depicted in FIG. 10A at time t7.

Note that the parent snapshot field 234 may specify a snapshot ID of a parent snapshot that preceded one or more child snapshots specified in the direct children snapshot list field 236. As illustrated, at time t7: snapshot 2 and snapshot 4 are children (e.g., branches) of snapshot 1, snapshot 3 and snapshot 7 are children of snapshot 2, snapshot 3 has no child snapshot, snapshot 5 and snapshot 6 are children of snapshot 4, snapshot 5 has no child snapshot, snapshot 6 has no child snapshot, and snapshot 7 has no child snapshot.

A processing module may utilize the vault snapshot file 230 to determine an oldest snapshot, a newest snapshot, and branch structure relationships between snapshots. For example, the processing module may utilize the vault snapshot file 230 to determine the oldest snapshot ID to delete when the processing module determines that it is time to delete the oldest snapshot. In another example, the processing module may utilize the vault snapshot file 230 to determine the newest (e.g., most recent) snapshot ID such that the processing module may determine a next snapshot ID to assign. In another example, the processing module may utilize the vault snapshot file 230 to determine where to add a new branch snapshot.

In an example of operation, the processing module determines to create a snapshot branch for one or more user vaults based on one or more of a user device message, a DS managing unit message, a command, and a predetermination. For instance, the processing module may receive the DS managing unit message from a DS managing unit that includes an add snapshot branch request. Next, the processing module retrieves the vault snapshot file 230 to determine the last snapshot ID (e.g., the highest number). The processing module then determines a new snapshot ID to assign based on the last snapshot ID (e.g., the new snapshot ID may be determined as the last snapshot ID plus one). In an instance, the processing module determines the new snapshot ID to be ID 7 at time t7 based on determining that ID 6 was the last snapshot ID.

The example continues with the processing module retrieving one or more directory files and determining which candidate parent snapshot shall be a parent snapshot to the newly assigned child snapshot 7. Such a determination may be based on one or more of an affiliation of data object revisions to the candidate parent snapshots, information received in a create new snapshot branch message, a list of desired data object revisions, a list of undesired data object revisions, a vault lookup, a predetermination, and a command. For instance, the processing module may determine to utilize snapshot 2 as the parent snapshot when revision 2 of the data object stuff.txt is desired and revision 3 of the same data object is undesired. Next, the processing module modifies the one or more directory files to indicate which data object revisions are affiliated with the new child snapshot 7. The processing module sends the updated directory files to the DSN memory for storage.

The example continues with the processing module retrieving a vault snapshot file 230 and modifying an entry to produce an updated vault snapshot file, wherein parent snapshot 2 includes snapshot 7 in the child snapshot list field 236. Next, the processing module dispersed storage error encodes the updated vault snapshot file to produce encoded vault snapshot slices. The processing module sends the encoded vault snapshot slices to a dispersed storage network (DSN) memory for storage.

In another example of operation, the processing module determines to delete a snapshot. Such a determination may be based on one or more of a current parent snapshot to direct children snapshots relationship (e.g., a vault snapshot file lookup), a data object revision to snapshot affiliation (e.g., a directory file lookup), a snapshot deletion policy, a command, a predetermination, a timetable, a memory utilization indicator, and a memory utilization threshold. In an example, the processing module enforces the snapshot deletion policy to maintain a fixed number of snapshots (e.g., 3) by deleting an oldest snapshot when a new snapshot is created. In another example, the processing module enforces the snapshot deletion policy to maintain a number of snapshots per user vault to be within a range (e.g., maximum ranges) as a function of memory utilization. In another example, the processing module enforces the snapshot deletion policy to maintain a minimum number of levels, layers, and/or parent snapshot-to-child snapshot relationships. For instance, the processing module determines to not delete any snapshots when the snapshot deletion policy requires that at least three layers of snapshots be maintained. As illustrated, snapshot 1 comprises layer 1, snapshot 2 and snapshot 4 comprise layer 2, and snapshot 3, snapshot 7, snapshot 5, and snapshot 6 comprise layer 3. In another instance, the processing module determines to delete snapshot 1 when the snapshot deletion policy requires that at least two layers of snapshots be maintained. Note that the processing module may delete a snapshot by deleting the snapshot ID from the directory files and/or deleting one or more data objects from the DSN memory as previously discussed.

Figure 11A:
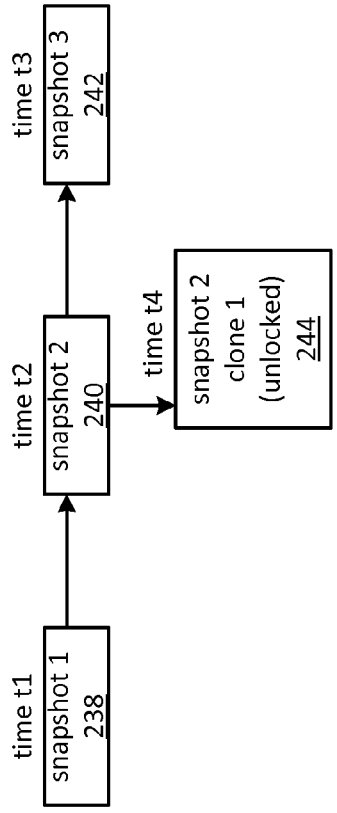
FIG. 11A is another structure diagram illustrating another example of a directory snapshot structure in accordance with the invention.

FIG. 11A is another structure diagram illustrating another example of a directory snapshot structure depicting linkage and timing history of snapshot creation. In an example, a processing module creates snapshot 1 238 at time t1, followed by the creation of snapshot 2 240 at time t2, followed by the creation of snapshot 3 242 at time t3, and snapshot 2 clone 1 244 created at time t4. Note that snapshot 2 clone 1 244 is a child snapshot of parent snapshot 2 240 where the clone 244 is identical to the parent 240 at the time of the creation of the clone. For instance, snapshot list field entries in a directory file may indicate that same data object revisions are affiliated with the parent snapshot and with the clone snapshot. Note that the clone snapshot may also appear in the direct child snapshot list affiliated with the parent snapshot in the vault snapshot file.

In an example, the processing module may create an unlocked clone snapshot where the entries in the snapshot list field of one or more directory files may be subsequently modified. For instance, the processing module alters a data object revision-to-snapshot identifier (ID) affiliation (e.g., by modifying a directory file) subsequent to creation of the snapshot clone. Note that this may provide a confidentiality improvement where a snapshot clone is created, data object revisions are added and/or deleted from the affiliations, and the modified snapshot clone is sent to a second user device for access to the remaining data objects. In this confidentiality improvement example, the second user device has no knowledge or access to the data object revisions that were removed from the snapshot clone but may still be stored in a dispersed storage network (DSN) memory.

In an example of operation, the processing module determines to create a snapshot clone for one or more user vaults based on one or more of a user device message, a dispersed storage (DS) managing unit message, a command, and a predetermination. For example, the processing module may receive a message from a user device that includes a request to add a snapshot clone. Such a request message may include one or more of a user ID, a create snapshot clone command, a list of data object revisions to include, a list of data object revisions to exclude, and a parent snapshot ID.

The example continues with the processing module retrieving one or more directory files and determines which candidate parent snapshot shall be a parent snapshot to the snapshot clone. Such a determination may be based on one or more of an affiliation of data object revisions to candidate parent snapshots, information received in the create snapshot clone message, a list of desired data object revisions, a list of undesired data object revisions, a vault lookup, a predetermination, and a command. For example, the processing module determines to utilize snapshot 2 as the parent snapshot when the processing module determines that snapshot 2 includes substantially all of the desired data object revisions. Next, the processing module modifies one or more directory files to indicate which data revisions are affiliated with the new snapshot clone. In addition, the processing module may determine to add additional data object revision-to-snapshot ID affiliations based on a list of desired data object revisions. The processing module may determine to remove data object revision-to-snapshot ID affiliations based on a list of undesired data object revisions.

Next, the processing module dispersed storage error encodes the updated directory files to produce encoded directory slices. The processing module sends the encoded directory slices to the DSN memory for storage. The example continues with the step where the processing module retrieves a vault snapshot file and modifies an entry for the parent snapshot to produce an updated vault snapshot file, wherein the updated vault snapshot file includes the snapshot clone ID in the correct child snapshot list field. The processing module dispersed storage error encodes the updated vault snapshot file to produce encoded vault snapshot slices. The processing module sends the encoded vault snapshot slices to the DSN memory for storage.

Figure 11B:
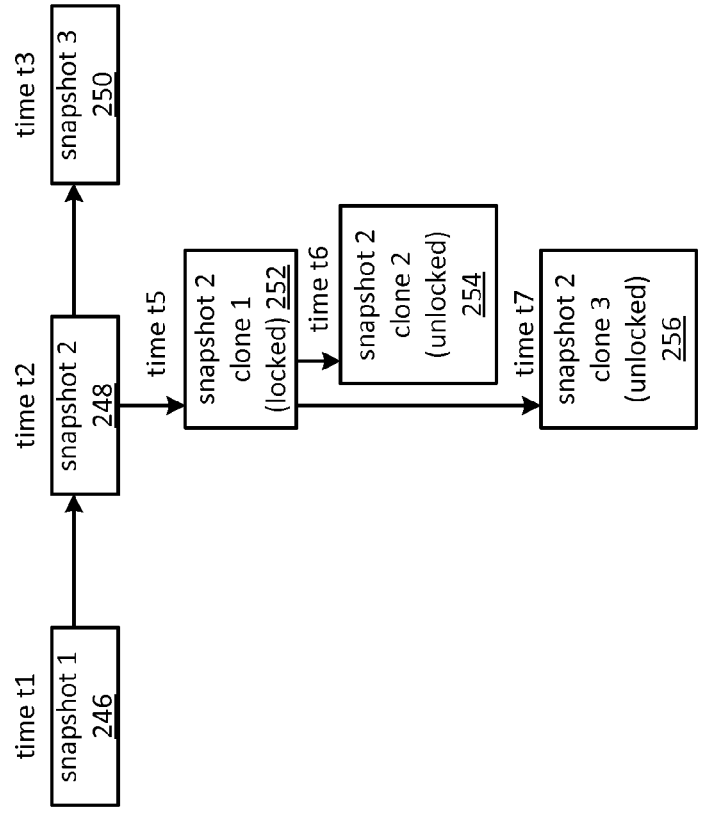
FIG. 11B is another structure diagram illustrating another example of a directory snapshot structure in accordance with the invention.

FIG. 11B is another structure diagram illustrating another example of a directory snapshot structure depicting linkage and timing history of snapshot creation. In an example, a processing module creates snapshot 1 246 at time t1, followed by snapshot 2 248 at time t2, followed by snapshot 3 250 at time t3. Next, the processing module locked snapshot 2 clone 1 252 at time t5. Note that in a previous example, snapshot 2 clone 1 was created at time t4 (e.g., unlocked). Note that snapshot 2 clone 1 252 is a child snapshot of snapshot 2 248 where the unlocked clone was identical to the parent at the time of the creation of the clone, but now may be different (e.g., modified since creation) when the clone 252 is locked at time t5. The processing module creates unlocked snapshot 2 clone 2 254 at time t6 and creates unlocked snapshot 2 clone 3 256 at time t7. Note that one or more unlocked clones may be created as children branches to a parent locked clone.

Note that a clone snapshot that is a child to a parent snapshot is identical to the parent snapshot at the time of the creation of the clone snapshot. A newly created clone snapshot is unlocked such that changes may be made in one or more of the directory files to add or delete data object revisions that are affiliated with the unlocked clone. As illustrated, two or more clones may be created that are affiliated with the same parent clone or snapshot. Note that each of the two or more clones may be unlocked and may describe different affiliations between data object revisions and snapshot IDs.

The processing module may determine to lock a clone and create a new unlocked clone that branches from the locked clone when the processing module has sent the now locked clone to a second user device (e.g., or other unit or module of the system). In such an instance, the processing module determines to lock the clone to freeze the record of the directory structure that may have been sent to the second user device.

In an example of operation, the processing module determines to create a snapshot clone for one or more user vaults based on one or more of a user device message, a dispersed storage (DS) managing unit message, a command, and a predetermination. For example, the processing module may receive a message from a user device that includes a request to add a snapshot clone. Such a request message may include one or more of a user identifier (ID), a create snapshot clone command, a list of data object revisions to include, a list of data object revisions to exclude, and a parent snapshot ID (e.g., which may include a clone snapshot ID).

The example continues with the processing module retrieving one or more directory files and determining which candidate parent snapshot shall be the parent snapshot to the snapshot clone. The determination may be based on one or more of the affiliation of data object revisions to the candidate parent snapshots, information received in the create snapshot clone message, a list of desired data object revisions, a list of undesired data object revisions, a vault lookup, a predetermination, and/or a command. For example, the processing module determines to utilize snapshot 2 clone 1 as a parent snapshot when the processing module determines that snapshot 2 clone 1 includes substantially all of the desired data object revisions. The processing module may lock the parent snapshot by changing its status to locked.

Next, the processing module modifies one or more directory files to produce an updated directory file, wherein the updated directory file indicates which data revisions are affiliated with the new snapshot clone. The processing module may determine to add additional data object revision-to-snapshot ID affiliations based on a list of desired data object revisions. The processing module may determine to remove data object revision-to-snapshot ID affiliations based on a list of undesired data object revisions. The example continues with the step where the processing module dispersed storage error encodes the updated directory file to produce encoded directory slices. The processing module sends the encoded directory slices to a dispersed storage network (DSN) memory for storage.

The example continues with the processing module retrieving a vault snapshot file and modifies an entry to produce an updated vault snapshot file, wherein the entry is modified for parent snapshot 2 clone 1 two include snapshot 2 clone 2 in a child snapshot list field. The processing module dispersed storage error encodes the updated vault snapshot file to produce encoded vault snapshot slices. Next, the processing module sends the encoded vault snapshot slices to the DSN memory for storage.

As illustrated, the processing module adds snapshot 2 clone 3 256 at time t7 utilizing substantially the same method as described above with the exception that the processing module does not need to lock snapshot 2 clone 1 252 since the processing module determines that snapshot 2 clone 3 is the second or more child of snapshot 2 clone 1. In such an instance, the processing module previously locked snapshot 2 clone 1 252 when the first child (e.g., snapshot 2 clone 254) was added. In another example of operation, the processing module adds any number of clones to a parent snapshot whether the parent is cloned or not. The processing module may keep the children snapshot clones unlocked such that modifications may be made to the data object revisions to snapshot revisions from time to time.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprises:
    obtaining a directory file that includes a plurality of entries, wherein an entry of the plurality of entries includes a file or directory name field, and a snapshot list field that includes a snapshot list;
    determining a clone snapshot identifier (ID) regarding a data file;
    updating the directory file to produce an updated directory file, wherein the updating includes updating the snapshot list field associated with the data file to include the clone snapshot ID in the snapshot list;
    dispersed storage error encoding the updated directory file to produce a set of encoded updated directory file slices; and
    sending the set of encoded updated directory file slices to a dispersed storage network (DSN) memory for storage.

2. The method of claim 1, wherein the clone snapshot ID corresponds to a clone snapshot associated with a previous snapshot regarding the data file.

3. The method of claim 2, wherein the clone snapshot includes at least one modification from the previous snapshot.

4. The method of claim 2, wherein the clone snapshot is selectively locked from further changes, or selectively unlocked to allow further changes.

5. The method of claim 1, wherein the snapshot list associates the clone snapshot ID with at least one previous snapshot ID.

6. The method of claim 1 further comprises:
    updating a vault snapshot file to associate the clone snapshot ID with at least one previous snapshot ID to produce an updated vault snapshot file that maintains a snapshot history.

7. The method of claim 6, wherein the updated vault snapshot file is associated with a vault of the DSN memory and the updated vault snapshot file maintains a parent-child relationship between the at least one previous snapshot ID and the clone snapshot ID.

8. A dispersed storage and task (DST) processing unit comprises:
    at least one module, when operable within a computing device, that causes the computing device to:
        obtain a directory file that includes a plurality of entries, wherein an entry of the plurality of entries includes a file or directory name field, and a snapshot list field that includes a snapshot list;
        determine a clone snapshot identifier (ID) regarding a data file;
        update the directory file to produce an updated directory file, wherein the updating includes updating the snapshot list field associated with the data file to include the clone snapshot ID in the snapshot list;
        dispersed storage error encode the updated directory file to produce a set of encoded updated directory file slices; and send the set of encoded updated directory file slices to a dispersed storage network (DSN) memory for storage.

9. The DST processing unit of claim 8 wherein the clone snapshot ID corresponds to a clone snapshot associated with a previous snapshot regarding the data file.

10. The DST processing unit of claim 9 wherein the clone snapshot includes at least one modification from the previous snapshot.

11. The DST processing unit of claim 8 wherein the clone snapshot is selectively locked from further changes, or selectively unlocked to allow further changes.

12. The DST processing unit of claim 8 wherein the snapshot list associates the clone snapshot ID with at least one previous snapshot ID.

13. The DST processing unit of claim 8 wherein the at least one module, when operable within the computing device, further causes the computing device to:
    updating a vault snapshot file to associate the clone snapshot ID with at least one previous snapshot ID to produce an updated vault snapshot file that maintains a snapshot history.

14. The DST processing unit of claim 13 wherein the updated vault snapshot file is associated with a vault of the DSN memory and the updated vault snapshot file maintains a parent-child relationship between the at least one previous snapshot ID and the clone snapshot ID.

15. A non-transitory computer readable storage medium comprises:
    at least one memory section that stores operational instructions that, when executed by one or more processing modules of one or more computing devices of a dispersed storage network (DSN), causes the one or more computing devices to:
    obtain a directory file that includes a plurality of entries, wherein an entry of the plurality of entries includes a file or directory name field, and a snapshot list field that includes a snapshot list;
    determine a clone snapshot identifier (ID) regarding a data file;
    update the directory file to produce an updated directory file, wherein the updating includes updating the snapshot list field associated with the data file to include the clone snapshot ID in the snapshot list;
    dispersed storage error encode the updated directory file to produce a set of encoded updated directory file slices; and
    send the set of encoded updated directory file slices to a dispersed storage network (DSN) memory for storage.

16. The non-transitory computer readable storage medium of claim 15 wherein the clone snapshot ID corresponds to a clone snapshot associated with a previous snapshot regarding the data file.

17. The non-transitory computer readable storage medium of claim 16 wherein the clone snapshot includes at least one modification from the previous snapshot.

18. The non-transitory computer readable storage medium of claim 16 wherein the clone snapshot is selectively locked from further changes, or selectively unlocked to allow further changes.

19. The non-transitory computer readable storage medium of claim 15 wherein the operational instructions, when executed by the one or more processing modules of the one or more computing devices of the dispersed storage network (DSN), further causes the one or more computing devices to:
    updating a vault snapshot file to associate the clone snapshot ID with at least one previous snapshot ID to produce an updated vault snapshot file that maintains a snapshot history.

20. The non-transitory computer readable storage medium of claim 19 wherein the updated vault snapshot file is associated with a vault of the DSN memory and the updated vault snapshot file maintains a parent-child relationship between the at least one previous snapshot ID and the clone snapshot ID.

* * * * *